(12) United States Patent
Gibbons

(10) Patent No.: US 7,508,456 B1
(45) Date of Patent: Mar. 24, 2009

(54) REMOTE CONTROL SYSTEM FOR ADJUSTING A VOLUME LEVEL OF A TELEVISION

(75) Inventor: Stephen A. Gibbons, Beaumont Hills (AU)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 12/182,366

(22) Filed: Jul. 30, 2008

(51) Int. Cl.
*H04N 3/24* (2006.01)
*H04N 5/60* (2006.01)
*H04N 5/44* (2006.01)

(52) U.S. Cl. .................. 348/632; 348/734; 348/725

(58) Field of Classification Search .......... 348/734, 348/632, 725, 738; 340/825.69, 825.72; 381/104–108, 58, 59; 455/352, 355, 92
See application file for complete search history.

(56) References Cited

U.S. PATENT DOCUMENTS 6,396,549 B1  5/2002  Weber
7,012,652 B1  3/2006  Weber
2003/0133551 A1*  7/2003  Kahn ................. 379/102.03

FOREIGN PATENT DOCUMENTS

JP  04233875 A  *  8/1992
JP  11017473 A  *  1/1999

* cited by examiner

*Primary Examiner*—M. Lee
(74) *Attorney, Agent, or Firm*—Cantor Colburn LLP; Carl Lanuti

(57) ABSTRACT

A remote control system for adjusting a volume level of a television is provided. The remote control system includes a handheld remote control device having a partial mute switch, a wireless signal transmitter, and a microprocessor. The microprocessor is operably coupled to the partial mute switch and to the wireless signal transmitter. The microprocessor is configured to induce the wireless signal transmitter to transmit a first wireless signal having an engage partial mute command to the television when the partial mute switch is depressed at a first time. The television is configured to receive the first wireless signal and to adjust the volume level of the television to a volume level in a range of 10-90% of a current volume level of the television in response to the engage partial mute command in the first wireless signal.

1 Claim, 4 Drawing Sheets

US 7,508,456 B1

REMOTE CONTROL SYSTEM FOR ADJUSTING A VOLUME LEVEL OF A TELEVISION

BACKGROUND OF THE INVENTION

1. Field of the Invention

This application relates to a remote control system for adjusting a volume level of a television.

2. Description of Background

A remote control device for a television has been developed with a mute button. The mute button provides an ability to immediately cut off audio output. Further, television broadcasters transmit commercials significantly louder than regular television programs that can be undersirable to viewers.

The inventor herein has recognized that viewers often multitask while watching a television and if the mute button is utilized to completely mute the sound level during commercials, the viewer has to frequently watch the television to determine when to un-mute the television when a regular television program resumes.

Accordingly, the inventor herein has recognized a need for an improved remote control system that utilizes a handheld remote control device with a partial mute button that minimizes and/or eliminates the above-mentioned deficiency.

SUMMARY OF THE INVENTION

A remote control system for adjusting a volume level of a television in accordance with an exemplary embodiment is provided. The remote control system includes a handheld remote control device having a partial mute switch, a wireless signal transmitter, and a first microprocessor. The first microprocessor is operably coupled to the partial mute switch and to the wireless signal transmitter. The first microprocessor is configured to induce the wireless signal transmitter to transmit a first wireless signal having an engage partial mute command to the television when the partial mute switch is depressed at a first time. The television has a wireless signal receiver, a memory device, and a second microprocessor coupled to the wireless signal receiver and the memory device. The wireless signal receiver is configured to receive the first wireless signal. The second microprocessor is configured to access a partial mute volume multiplier value in a range of 10-90% from the memory device and to multiply the partial mute volume multiplier value by a first current volume level value to obtain an updated volume level value. The first current volume level is indicative of a current volume level of a speaker in the television. The second microprocessor is further configured to adjust the volume level of the speaker to an updated volume level corresponding to the updated volume level value. The first microprocessor of the handheld remote control device is further configured to induce the wireless signal transmitter to transmit a second wireless signal having a disengage partial mute command to the television when the partial mute switch is depressed at a second time after the first time. The wireless signal receiver of the handheld remote control device is further configured to receive the second wireless signal. The second microprocessor is further configured to adjust the volume level of the speaker in the television to the first current volume level in response to the disengage partial mute command.

DETAILED DESCRIPTION OF THE INVENTION

Figure 1:
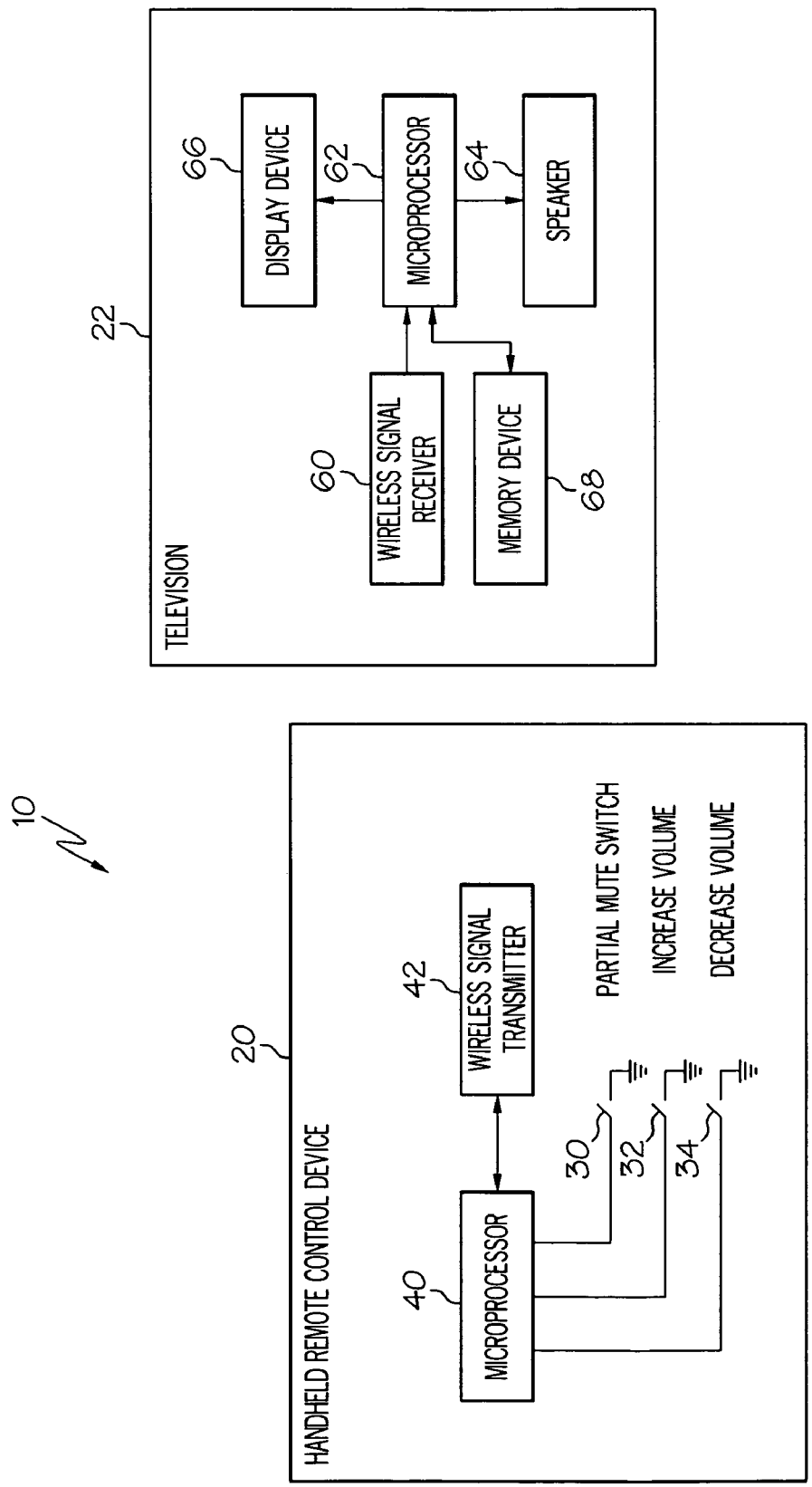
FIG. 1 is a schematic of a remote control system in accordance with an exemplary embodiment.

Referring to FIG. 1, a remote control system 10 for adjusting a volume of the television 22 is illustrated. The remote control system 10 includes the handheld remote control device 20 and the television 22. An advantage of the remote control system 10 is that the handheld remote control device 20 includes a partial mute switch 30 that allows the television 22 to be partially muted.

The handheld remote control device 20 is provided to control the television 22, and in particular to control a volume level of the television 22. The handheld remote control device 20 includes the partial mute switch 30, an increase volume switch 32, a decrease volume switch 34, a microprocessor 40, and a wireless signal transmitter 42. The microprocessor 40 is operably coupled to the partial mute switch 30, the increase volume switch 32, the decrease volume switch 34, and the wireless signal transmitter 42. During operation, when the partial mute switch 30 is depressed which closes the switch 30, the microprocessor 40 is configured to induce the wireless signal transmitter 42 to transmit a first wireless signal having an engage partial mute command to the television 22. Next, when the partial mute switch 30 is depressed, or the increase volume switch 32 is depressed, or the decrease volume switch 34 is depressed, the microprocessor 40 is configured to induce the wireless signal transmitter 42 to transmit a second wireless signal having a disengage partial mute command to the television 22. In one exemplary embodiment, the wireless signal transmitter 42 is an infrared signal transmitter that transmits an infrared signal having a command therein. In another exemplary embodiment, the wireless signal transmitter 42 is an RF signal transmitter that transmits an RF signal having a command therein.

The television 22 is provided to display television programs and commercials on the display device 60 and to emit sound at a selected sound level from the speaker 64. The television 22 includes a wireless signal receiver 60, a microprocessor 62, the speaker 64, the display device 66, and a memory device 68. The microprocessor 62 is operably coupled to the wireless signal receiver 60, the speaker 64, the display device 66, and the memory device 68 and controls operation thereof. The memory device 68 stores software routines and data generated by the microprocessor 62. In particular, the memory device 68 stores a partial mute volume multiplier value utilized by the microprocessor 62 for partially muting a volume level of the television as will be explained in greater detail below.

During operation, in one exemplary embodiment, the wireless signal receiver 60 is configured to receive the first wireless signal having the engage partial mute command from the wireless signal transmitter 42. Thereafter, the microprocessor 62 is configured to multiply a partial mute volume multiplier value in a range of 10-90% by a first current volume level value to obtain an updated volume level value, in response to the engage partial mute command in the first wireless signal. The first current volume level value is indicative of a current volume level of the television 22. The microprocessor 62 is further configured to adjust the volume level of the speaker 62 in the television 22 to an updated volume level corresponding to the updated volume level value. It should be noted that the partial mute volume multiplier value can be changed by a user within the range of 10-90%, to a value such as 30% or 40% or 50% or 60% for example.

The wireless signal receiver 60 is further configured to receive the second wireless signal having the disengage partial mute command from the wireless signal transmitter 42. The microprocessor 62 is further configured to adjust the volume level of the speaker 64 in the television 22 to the first current volume level in response to the disengage partial mute command in the second wireless signal.

The user can adjust a value of the partial mute volume multiplier value utilized in the television 22 in a range of 10-90% by either (i) depressing both the partial mute switch 30 and the increase volume switch 32, or (ii) depressing both the partial mute switch 30 and the decrease volume switch 34. For example, a user could increase the partial mute volume multiplier from a value of 40% to a value of 45% by depressing both the partial mute switch 30 and the increase volume switch 32. Further, for example, a user could decrease the partial mute volume multiplier from a value of 90% to a value of 80% by depressing both the partial mute switch 30 and the decrease volume switch 34.

Figure 2:
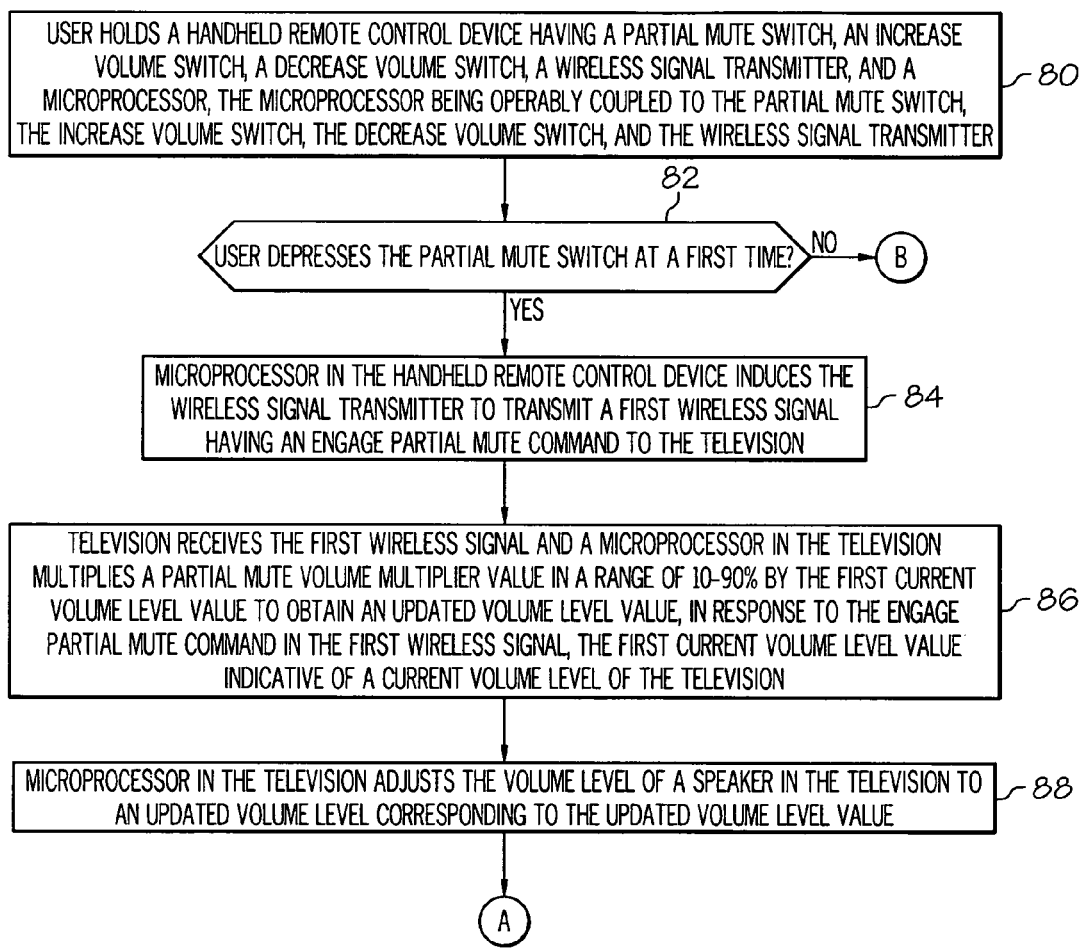
FIGS. 2-4 are flowcharts of a method for adjusting a volume of a television in accordance with another exemplary embodiment.
Figure 3:
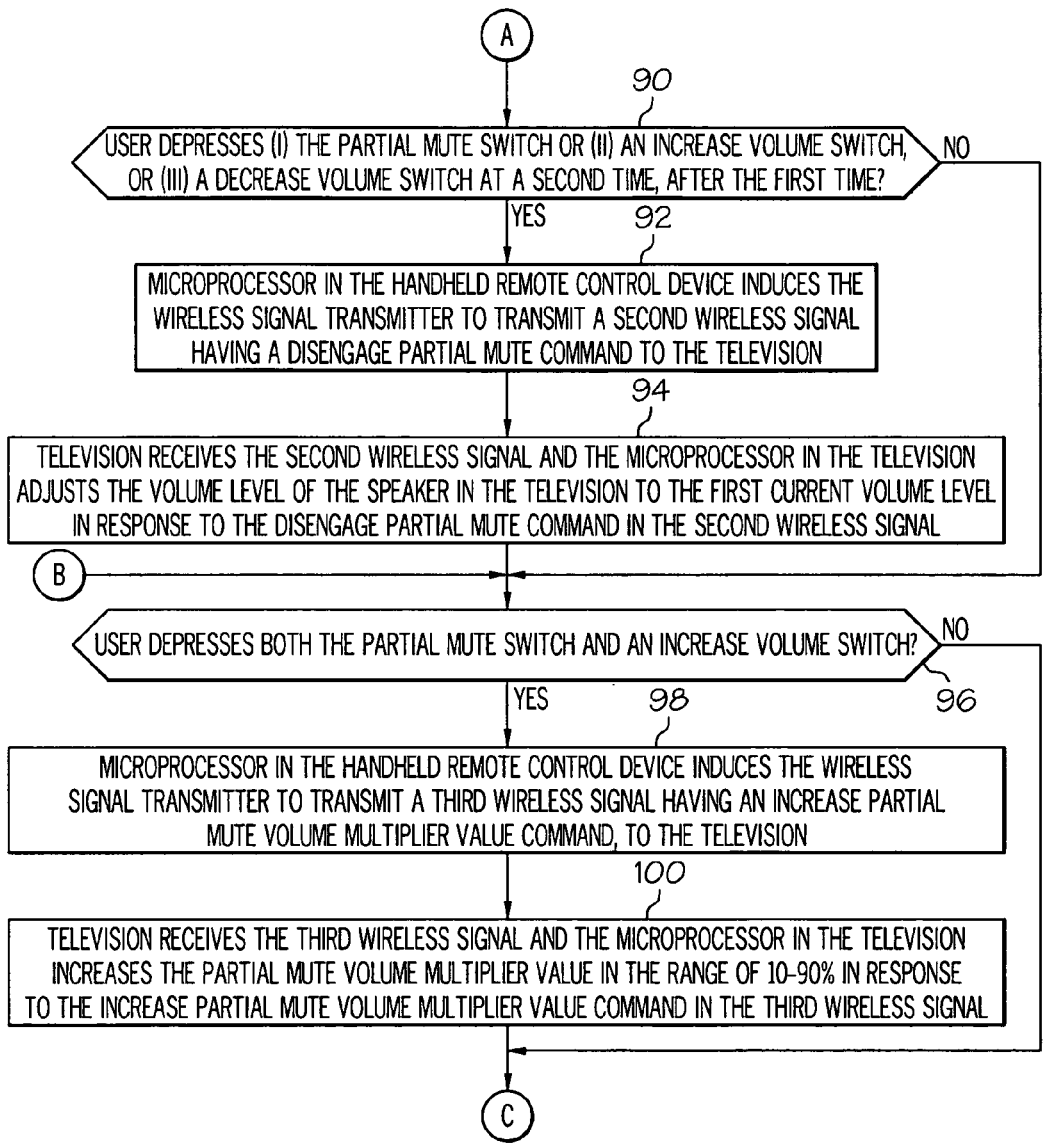
Figure 4:
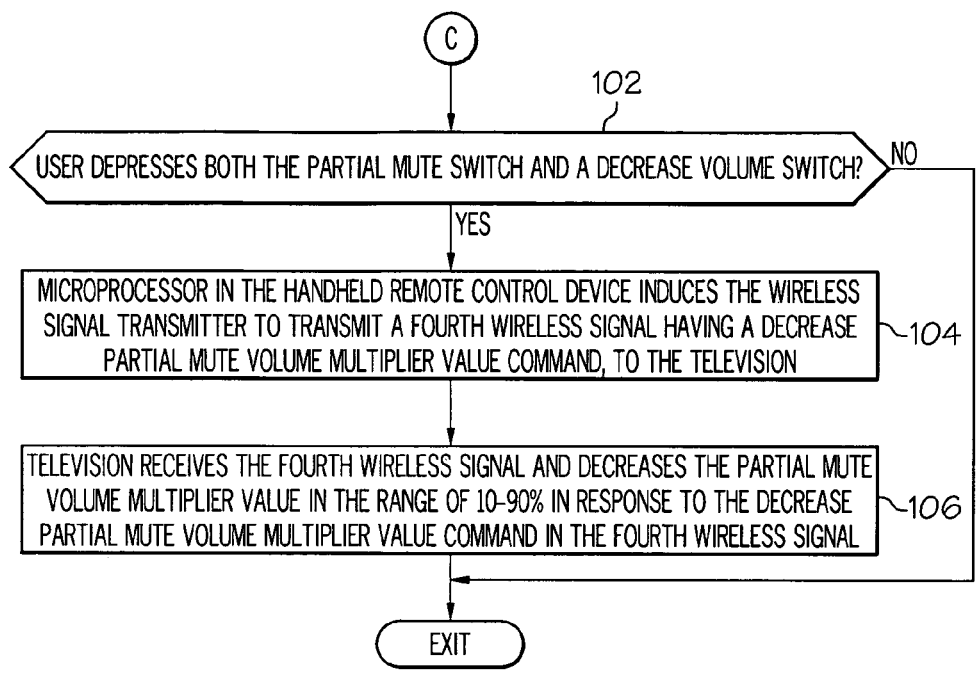

Referring to FIGS. 2-4, a flowchart of a method for adjusting a volume level of a television in accordance with an exemplary embodiment is illustrated.

At step 80, a user holds the handheld remote control device 20 having the partial mute switch 30, the increase volume switch 32, the decrease volume switch 34, the wireless signal transmitter 42, and the microprocessor 40. The microprocessor 40 is operably coupled to the partial mute switch 30, the increase volume switch 32, the decrease volume switch 34, and the wireless signal transmitter 42.

At step 82, if the user depresses the partial mute switch 30 at a first time, the method advances to step 84. Otherwise, the method advances to step 96.

At step 84, the microprocessor 40 in the handheld remote control device 20 induces the wireless signal transmitter 42 to transmit a first wireless signal having an engage partial mute command to the television 22.

At step 86, the wireless signal receiver 60 of the television 22 receives the first wireless signal and the microprocessor 62 in the television 22 accesses a partial mute volume multiplier value in a range of 10-90% from the memory device 68 and multiplies the partial mute volume multiplier value by a first current volume level value to obtain an updated volume level value, in response to the engage partial mute command in the first wireless signal. The first current volume level value is indicative of a current volume level of the television 22.

At step 88, the microprocessor 62 in the television 22 adjusts the volume level of the speaker 64 in the television 22 to an updated volume level corresponding to the updated volume level value.

At step 90, if the user depresses (i) the partial mute switch 30 or (ii) the increase volume switch 32, or (iii) the decrease volume switch 34 at a second time, after the first time, the method advances to step 92. Otherwise, the method advances to step 102.

At step 92, the microprocessor 40 in the handheld remote control device 20 induces the wireless signal transmitter 42 to transmit a second wireless signal having a disengage partial mute command to the television 22.

At step 94, the wireless signal receiver 60 of the television 22 receives the second wireless signal and the microprocessor 62 in the television 22 and retrieves the first current volume level value from the memory device 68 in response to the disengage partial mute command in the second wireless signal. Further, the microprocessor 62 adjusts the volume level of the speaker 64 in the television 22 to the first current volume level associated with the first current volume level value in response to the disengage partial mute command in the second wireless signal.

At step 96, if the user depresses both the partial mute switch 30 and the increase volume switch 32, the method advances to step 98. Otherwise, the method advances to step 102.

At step 98, the microprocessor 40 in the handheld remote control device 20 induces the wireless signal transmitter 42 to transmit a third wireless signal having an increase partial mute volume multiplier value command, to the television 22.

At step 100, the wireless signal receiver 60 of the television 22 receives the third wireless signal and the microprocessor 62 in the television 22 increases the partial mute volume multiplier value in a range of 10-90% in response to the increase partial mute volume multiplier value command in the third wireless signal and stores the partial mute volume multiplier value in the memory device 68.

At step 102, if the user depresses both the partial mute switch 30 and the decrease volume switch 34, the method advances to step 104. Otherwise, the method is exited.

At step 104, the microprocessor 40 in the handheld remote control device 20 induces the wireless signal transmitter 42 to transmit a fourth wireless signal having a decrease partial mute volume multiplier value command, to the television 22.

At step 106, the wireless signal receiver 60 of the television 22 receives the fourth wireless signal and decreases the partial mute volume multiplier value in a range of 10-90% and stores the partial mute volume multiplier value in the memory device 68, in response to the decrease partial mute volume multiplier value command in the fourth wireless signal. After step 106, the method is exited.

The remote control system described herein provides a substantial advantage over other systems. In particular, the remote control system has a handheld remote control device with a partial mute switch that provides a technical effect of partially muting a television in a range of 10-90% of a current volume level of the television.

While the invention is described with reference to an exemplary embodiment, it will be understood by those skilled in the art that various changes may be made and equivalence may be substituted for elements thereof without departing from the scope of the invention. In addition, many modifications may be made to the teachings of the invention to adapt to a particular situation without departing from the scope thereof. Therefore, it is intended that the invention not be limited the embodiments disclosed for carrying out this invention, but that the invention includes all embodiments falling with the scope of the appended claims. Moreover, the use of the terms first, second, etc. does not denote any order of importance, but rather the terms first, second, etc. are used to distinguish one element from another.

What is claimed is:

1. A remote control system for adjusting a volume level of a television, comprising:

a handheld remote control device having a partial mute switch, a wireless signal transmitter, and a first microprocessor, the first microprocessor being operably coupled to the partial mute switch and to the wireless signal transmitter, the first microprocessor configured to induce the wireless signal transmitter to transmit a first wireless signal having an engage partial mute command to the television when the partial mute switch is depressed at a first time;

the television having a wireless signal receiver, a memory device, and a second microprocessor coupled to the wireless signal receiver and the memory device, the wireless signal receiver configured to receive the first wireless signal, the second microprocessor configured to access a partial mute volume multiplier value in a range of 10-90% from the memory device and to multiply the partial mute volume multiplier value by a first current volume level value to obtain an updated volume level value, the first current volume level being indicative of a current volume level of a speaker in the television, the second microprocessor further configured to adjust the volume level of the speaker to an updated volume level corresponding to the updated volume level value;

the first microprocessor of the handheld remote control device further configured to induce the wireless signal transmitter to transmit a second wireless signal having a disengage partial mute command to the television when the partial mute switch is depressed at a second time after the first time; and the wireless signal receiver of the handheld remote control device further configured to receive the second wireless signal, the second microprocessor further configured to adjust the volume level of the speaker in the television to the first current volume level in response to the disengage partial mute command.

* * * * *